(12) United States Patent
Huang

(10) Patent No.: US 8,460,809 B2
(45) Date of Patent: Jun. 11, 2013

(54) LITHIUM-IRON DISULFIDE CELL DESIGN

(75) Inventor: Weiwei Huang, Westlake, OH (US)

(73) Assignee: Eveready Battery Company, Inc, St. Louis, MO (US)

( * ) Notice: Subject to any disclaimer, the term of this patent is extended or adjusted under 35 U.S.C. 154(b) by 252 days.

(21) Appl. No.: 12/904,447

(22) Filed: Oct. 14, 2010

(65) Prior Publication Data

US 2011/0086254 A1    Apr. 14, 2011

Related U.S. Application Data

(60) Provisional application No. 61/251,330, filed on Oct. 14, 2009.

(51) Int. Cl.
 *H01M 2/26* (2006.01)
(52) U.S. Cl.
 USPC ............................ 429/66; 429/94; 429/211
(58) Field of Classification Search
 USPC ...................... 429/66, 94, 161, 211
 See application file for complete search history.

(56) References Cited

U.S. PATENT DOCUMENTS

| | | | |
|---|---|---|---|
| 5,290,414 A | 3/1994 | Marple | |
| 6,849,360 B2 | 2/2005 | Marple | |
| 7,157,185 B2 | 1/2007 | Marple | |
| 7,335,440 B2 * | 2/2008 | Aamodt et al. | 429/94 |
| 2005/0079404 A1 | 4/2005 | Schubert et al. | |
| 2005/0112462 A1 | 5/2005 | Marple | |
| 2005/0233214 A1 | 10/2005 | Marple | |
| 2005/0244706 A1 | 11/2005 | Wu et al. | |
| 2006/0257726 A1 | 11/2006 | Kelley et al. | |
| 2007/0275298 A1 | 11/2007 | Igoris et al. | |
| 2008/0026293 A1 | 1/2008 | Marple et al. | |
| 2008/0076022 A1 | 3/2008 | Marple | |
| 2008/0213651 A1 | 9/2008 | Wu et al. | |
| 2008/0226982 A1 | 9/2008 | Schubert | |
| 2008/0254343 A1 | 10/2008 | Kaplin et al. | |
| 2009/0104520 A1 | 4/2009 | Marple | |
| 2010/0255357 A1 | 10/2010 | Baek et al. | |

FOREIGN PATENT DOCUMENTS

| CN | 101188311 A | 5/2008 |
|---|---|---|
| WO | 2008013853 A2 | 1/2008 |
| WO | 2009038705 A1 | 3/2009 |

OTHER PUBLICATIONS

U.S. Appl. No. 12/480,015, filed Jun. 8, 2009.
Patent Cooperation Treaty (PCT), International Search Report and Written Opinion for Application No. PCT/US2010/052607, filed Oct. 14, 2010, mailed Jan. 25, 2011, European Patent Office, Netherlands.

* cited by examiner

*Primary Examiner* — Stephen J. Kalafut
(74) *Attorney, Agent, or Firm* — Eveready Battery Company, Inc

(57) ABSTRACT

The invention relates to primary electrochemical cells having a jellyroll electrode assembly that includes a lithium-based negative electrode, a positive electrode with a coating comprising iron disulfide deposited on a current collector and a polymeric separator. More particularly, the invention relates to a cell design which optimizes cell capacity and substantially eliminates premature voltage drop-off on intermittent service testing. The resulting cell has a region of increased lithium thickness proximate to/under the terminal end of the outermost edge of the cathode strip.

15 Claims, 13 Drawing Sheets

| Figure # | Construction* | Test | Cutoff Voltage (V) | Total lithium capacity prior to predischarge(mAh) | Actual discharge capacity (mAh) | Lithium utilization** |
|---|---|---|---|---|---|---|
| Fig 3A | COW | 250mA 1hpd | 0.9 | 3865 | 3000 | 78% |
| Fig 3B | AOW | 250mA 1hpd | 0.9 | 4019 | 3159 | 79% |
| Fig 4A | COW | 1000mA, 10S on/50S off 1hpd | 0.9 | 3776 | 2517 | 67% |
| Fig 4B | AOW | 1000mA, 10S on/50S off 1hpd | 0.9 | 3981 | 3120 | 78% |
| Fig 5A | COW | 1000mA, 10S on/50S off 1hpd | 0.9 | N/A | 2626 | N/A |
| Fig 5B | COW | 250mA 1hpd | 0.9 | N/A | 2822 | N/A |
| Fig 5C | COW | 250mA 1hpd | 0.9 | N/A | 2480 | N/A |
| Fig 1 | AOW | 200mA continuous | 1.0 | 3776 | 3123 | 83% |
|  | COW | 200mA continuous | 1.0 | 3776 | 3381 | 90% |
| Fig 7A | COW | 250mA 1hpd | 0.9 | 3757 | 3234 | 86% |
| Fig 7B | COW | 250mA 1hpd | 0.9 | 3591 | 3177 | 88% |
| Fig 8A | COW | 250mA 1hpd | 0.9 | 3591 | 3161 | 88% |
| Fig 8B | COW | 1000mA, 10S on/50S off 1hpd | 0.9 | 3757 | 3137 | 84% |
| Fig 9 | COW | 1000mA, 10S on/50S off 1hpd | 0.9 | 3591 | 3187 | 89% |

*AOW = anode outer wrap; COW = cathode outer wrap
**Lithium utilization is measured based upon the total lithium input into the cell, irrespective of interfacial alignment.

FIGURE 10

LITHIUM-IRON DISULFIDE CELL DESIGN

FIELD OF INVENTION

The invention relates to primary electrochemical cells having a jellyroll electrode assembly that includes a positive electrode with a coating comprising iron disulfide deposited on a current collector, a lithium-based negative electrode including a small region of increased thickness proximate to/under the terminal end of the outermost edge of the cathode strip, and a polymeric separator. More particularly, the invention relates to a cell design which optimizes cell capacity and substantially eliminates premature voltage drop-off on intermittent service testing.

BACKGROUND

Electrochemical cells are presently the preferred method of providing cost effective portable power for a wide variety of consumer devices. The consumer device market dictates that only a handful of standardized cell sizes (e.g., AA or AAA) and specific nominal voltages (typically 1.5 V) be provided. Moreover, more and more consumer electronic devices, such as digital still cameras, are being designed with relatively high power operating requirements. As has been the practice within the market, consumers often prefer and opt to use primary batteries for their convenience, reliability, sustained shelf life and more economical per unit price as compared to currently available rechargeable (i.e., secondary) batteries.

Within this context, it is readily apparent that design choices for primary (i.e., non-rechargeable) battery manufacturers are extremely limited. For example, the necessity of using specified nominal voltages significantly limits the selection of potential electrochemical materials, and the use of standardized cell sizes restricts the overall available internal volume available for active materials, safety devices and other elements typically expected in such consumer products. What's more, the variety of consumer devices and the range of operating voltages for those devices make smaller nominal voltage cells (which can be provided separately or in series, thereby giving device makers more design options) more versatile as compared to higher voltage electrochemical pairings typically associated with secondary batteries. Thus, 1.5 V systems, such as alkaline or lithium-iron disulfide systems, are far more prominent than others, such as 3.0 V and higher lithium-manganese dioxide.

Even among the 1.5V electrochemical systems (e.g., alkaline v. lithium-iron disulfide, etc.), the design considerations are significantly different. For example, alkaline and nickel oxy-hydroxide systems rely on an aqueous and highly caustic electrolyte that has a propensity for gas expansion and/or leakage, leading to very different approaches in terms of selection of internal materials and/or compatibility with containers and closures. In rechargeable 1.5 V systems (note that lithium-iron disulfide systems are not currently considered suitable for consumer-based rechargeable systems), various highly specialized electrochemical and/or electrolyte compositions may be used to best accommodate lithium ion charge/discharge cycling. Here, such high cost components are not a key design concern because secondary systems typically sell for a higher retail price than their primary battery equivalents. Moreover, the discharge mechanisms, cell designs and safety considerations are, by and large, inconsequential and/or inapplicable to primary systems.

Although lithium-iron disulfide cells display distinct advantages for high power devices (as compared to primary alkaline cells), $LiFeS_2$ cell designs must strike a balance between the cost of materials used, the incorporation of necessary safety devices and the overall reliability, delivered capacity and intended use of the designed cell. In addition to improved capacity, cell designers must also consider other important characteristics, such as safety and reliability. Safety devices normally include venting mechanisms and thermally activated "shutdown" elements, such as positive thermal circuits (PTCs), while improvements to reliability primarily focus on preventing internal short circuits. In every example above, these desired traits require elements that occupy internal volume and/or design considerations that are usually counterproductive to cell internal resistance, efficiency or discharge capacity. Additional challenges are posed by regulations limiting the percent amount of weight lithium batteries can lose during thermal cycling, meaning that cell designs for smaller container sizes like AA and AAA can only lose milligrams of total cell weight (usually by way of evaporation of the electrolyte) even though the reactive and volatile nature of the non-aqueous electrolyte severely limits the universe of potential materials available.

The jellyroll electrode assembly is the preferred configuration in $LiFeS_2$ systems. In order to effectively utilize iron disulfide in this configuration, the iron disulfide is mixed into slurry with the minimal amount of conductors and binders permitted to still effectively discharge the cell. This slurry is then coated and dried on a metallic foil current collector for utilization in the jellyroll, while the lithium is most effectively provided without a current collector. The separator is a thin polymeric membrane whose thickness is preferably minimized to reduce the inactive inputs into the cell. In order to maximize active materials, the anode will often consist essentially of lithium or a lithium alloy which doubles as a current collector along the entire circumferential length of the jellyroll.

Because the reaction end products of the lithium-iron disulfide electrochemical reaction occupy substantially more volume than the inputs, the electrode assembly swells as the battery discharges. In turn, swelling creates radial forces that can cause unwanted bulging of the cell container, as well as short circuits if the separator is compromised and/or disconnection within the anode itself. Previous means of handling these problems include using strong (often thicker) materials for the cell housing and inactive components within the cell. However, thicker inactive materials limit the internal volume available and thicker, more rugged electrodes were previously deemed not necessarily desirable because they allow for fewer winds possible in the jellyroll, resulting in less surface area between the electrodes and the expectation of comparatively lower performance at higher drain rates.

A number of approaches have been taken to strike an appropriate balance between optimal internal volume utilization and acceptable $LiFeS_2$ cell capacity/performance. For example, a possible solution for problems created by swelling, disclosed in U.S. Pat. No. 4,379,815, is to balance cathode expansion and anode contraction by mixing one or more other active materials (such as CuO, $Bi_2O_3$, $Pb_2Bi_2O_5$, $P_3O_4$, $CoS_2$) with pyrite, although these additional materials can negatively affect the discharge characteristics of the cell, and the capacity and efficiency of the overall cell may also suffer. Other means of improving discharge capacity in $LiFeS_2$ cell contemplate the use of thinner separators and/or specific cathode coating mixes and coating techniques, as disclosed in U.S. Patent Publication Nos. 20050112462 and 20050233214, or through the adjustment of interfacial input materials, as disclosed in U.S. Pat. Nos. 6,849,360 and 7,157,185.

Ultimately, improvements to capacity represent a fundamentally sound battery design. That is, in order to deliver greater capacity, careful consideration must be given for the radial expansion forces and other dynamics at work in a discharging lithium-iron disulfide battery. For example, if the design provides inadequate thickness in the anode or the cathode current collector then the radial forces during discharge may compress the jellyroll to such a degree so as to cause a disconnect in one or both electrodes and, once this disconnect occurs, the battery may cease to deliver capacity regardless of whether the active materials have all been discharged. Similar situations arise with respect to the void volume (in the cathode coating and the interior of the cell as a whole), the electrical connections throughout the battery, the separator, the closure/venting mechanism for the battery and the like. Therefore, the capacity of a $LiFeS_2$ cell is a significant metric for the overall viability and robustness of a cell design, particularly when the cell designer is limited to the use of a standard-sized consumer battery (e.g., AA or FR6; AAA or FR03; etc.)

As a corollary to the capacity acting as a de facto metric for battery design, those skilled in the art will appreciate that design choices, and particularly the selection of specific components, must be made in consideration of the overall battery. A specific composition may have surprising, unexpected or unintended effects upon the other components and compositions within the cell. Similarly, in standard sized batteries, the selection of a particular element occupies volume within the container that might otherwise have been available for other elements. Thus, this interdependency of design choices necessarily means that any increase in capacity, and especially an increase that does not negatively impact the safety or performance of the battery in other regards, is much more than a simple act of adding more active materials. Similarly, the selection of inactive components, and particularly solvents, solutes, binders, conductors, polymers for the separator or seal and the like, must necessarily be made in context of the exigencies of the situation and in light of the vast multitude of choices, and isolating single items from an extensive list of possibilities is not by itself sufficient reason for an artisan to consider using in that particular combination.

Tests that simulate the actual discharge or use of the battery have particular relevance to evaluating cell designs. Typically, these simulated-use tests involve discharging the battery under specified discharge conditions (e.g., a constant load of 200 mA) continuously or in a predetermined cycle (e.g., discharge for a set number of minutes, followed by a rest interval of a set number of minutes) until the battery output voltage drops below a final "cut off voltage". As used herein, tests that involve a cycle of discharge and rest intervals will be generically referred to as intermittent drain rate tests. Clearly, with any simulated use test, it is necessary to specify the discharge conditions, periods of time for discharge and the rest interval (if used) and the cut off voltage.

One particularly significant intermittent drain rate test is the ANSI Digital Still Camera Test ("DSC test"). The DSC test simulates the drain experienced by batteries inserted into a digital camera, which typically require short periods of high power demand while the user takes photographic images, followed by longer periods of inactivity. Accordingly, the DSC test for a AA sized battery involves discharging the battery at 1500 mW for 2 seconds followed by 650 mW for 28 second, and this 30 second cycle is repeated for 5 minutes every hour (i.e., 10 cycles/hour) followed by a rest period (i.e., 0 mW) for 55 minutes. Each 30 second cycle is intended to represent one digital still camera image. This one hour cycle is repeated every hour until the battery first records an output voltage of less than 1.05, although cell designers may occasionally continue the test beyond this end point to further observe battery discharge characteristics. The final performance is quantified in terms of number of minutes or number of images taken (i.e., the number of images will always be double the number of minutes on this test). Significantly, the cyclic, high-power requirements of this test make it one of the most difficult benchmarks for a battery design, while at the same time producing the most meaningful basis of comparison for battery consumers. Numerous other intermittent tests are known and utilized in this field, including those specified by the American National Standards Institute ("ANSI"), the International Electrotechnical Commission ("IEC") and the like.

BRIEF DESCRIPTION OF DRAWINGS

FIG. 2C illustrates partial radial cross sectional views of the jellyroll to highlight the relative location of the lithium patch according to several embodiments of the invention, while

FIG. 10 provides information in tabular form with respect to the voltage discharge curves of the previous Figures.

SUMMARY OF INVENTION

Figure 1:
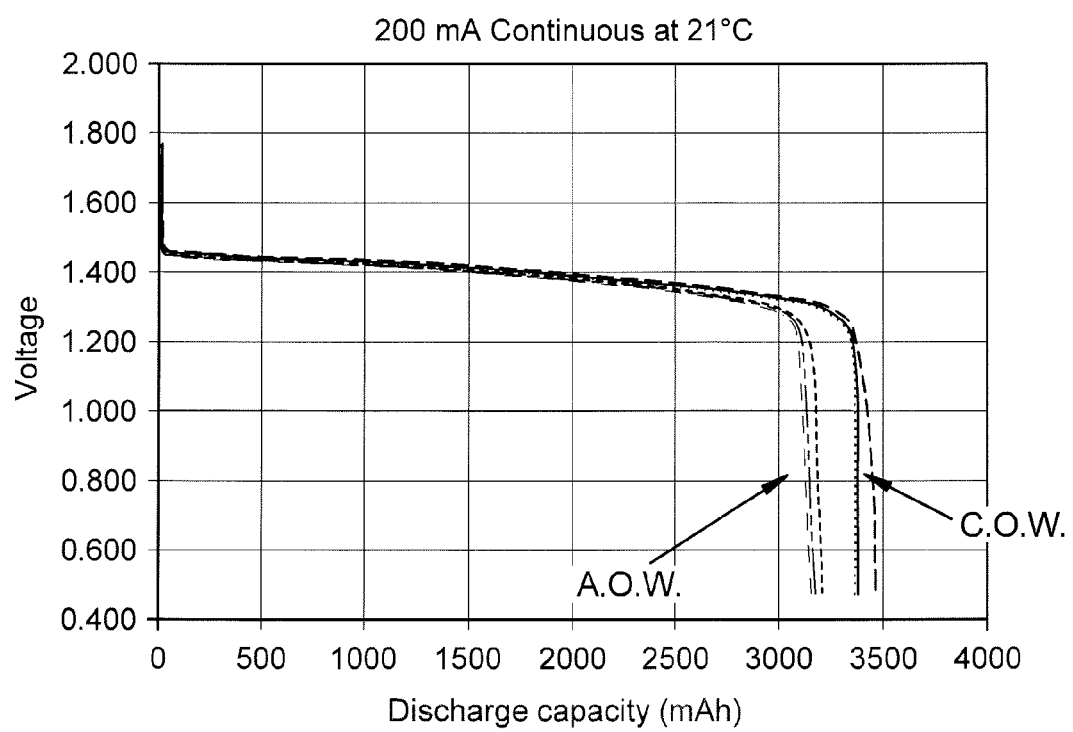
FIG. 1 compares discharge profiles for prior art anode outer wrap and cathode outer wrap lithium-iron disulfide cell designs on a continuous discharge test.

The invention comprises a plurality of embodiments for an electrochemical cell, along with a method for improving the discharge capacity of an electrochemical cell. As such, the cell may include any one or combination of the following elements:

a cylindrical container having positive and negative terminals;

an organic, non-aqueous electrolyte;

an electrode assembly having an anode consisting essentially of lithium or a lithium alloy strip having a thickness, a cathode comprising iron disulfide at least partially coated onto both sides of a solid, metallic foil current collector and a separator disposed between the anode and the cathode;

an electrode assembly having an anode consisting essentially of lithium or a lithium alloy strip, a cathode comprising iron disulfide at least partially coated onto both sides of a solid, metallic foil current collector and a separator disposed between the anode and the cathode;

a first lead establishing electrical connection between the cathode to the positive terminal and a second lead establishing electrical connection between the anode to the negative terminal;

wherein the anode and the cathode are spirally wound so that at least 50% of an outermost surface of the electrode assembly, excluding the separator and optional non-active components, is covered by the cathode;

wherein the cathode at the outermost surface includes a terminal edge oriented in a substantially axial direction relative to the cylindrical container;

wherein the electrode assembly further comprises one selected from the group consisting of: a) a lithium or lithium-alloy patch, oriented in the axial direction and attached to an outermost wind of the anode directly underneath the terminal edge of the cathode, and wherein the second lead is attached to the outermost wind of the anode on the outermost surface of the electrode assembly; and b) a lithium or a lithium alloy combined patch-lead, oriented in the axial direction and attached to the anode, and wherein the combined patch-lead acts as the second lead for the cell;

wherein the anode has a substantially uniform thickness except for a localized area of increased thickness directly underneath the terminal edge of the cathode;

wherein the patch or the combined patch-lead has a thickness that is at least one half of the thickness of the anode;

wherein the localized area of increased thickness is at least 150% of a thickness of the remaining anode;

wherein the localized area of increased thickness comprises a lithium patch affixed to an inner-facing or outer-facing surface of the anode at a point directly underneath the terminal edge of the cathode;

wherein the patch or the combined patch-lead further comprises a support member positioned so as to still permit direct physical contact between the lithium or lithium alloy of the anode and the lithium or lithium alloy of the patch or the combined patch-lead;

wherein the support member is made from at least one polymeric material selected from the group consisting of: a polyolefin, polyethylene, polypropylene, polyimide and polyester;

wherein the combined patch-lead is present and attached to an inner wind of the anode within the electrode assembly;

wherein the patch is formed as a plurality of individual pieces of lithium spaced apart along the axial direction; and/or wherein the patch is present and attached to an outer-facing side of the anode.

In the same manner, the method may comprise any one or combination of the following steps:

providing a lithium-iron disulfide electrochemical cell with a spiral wound electrode assembly having an outermost surface, excluding the separator and optional non-active components, that is at least 50% covered by a cathode strip;

creating a localized area of increased thickness in the anode strip and positioning said localized area of increased thickness proximate to an outermost terminal edge of the cathode strip within the electrode assembly;

causing the cell to be discharged; and/or wherein the creating a localized area of increased thickness comprises providing a lithium or lithium alloy patch to an anode strip within the electrode assembly proximate to an outermost terminal edge of the cathode strip.

DESCRIPTION OF OTHER PREFERRED ELEMENTS

Unless otherwise specified, as used herein the terms listed below are defined and used throughout this disclosure as follows:

ambient temperature or room temperature—between about 20° C. and about 25° C.; unless otherwise stated, all examples, data and other performance and manufacturing information were conducted at ambient temperature and atmospheric conditions;

anode—the negative electrode; more specifically, in a lithium-iron disulfide cell, it consists essentially of lithium or lithium-based alloy (i.e., an alloy containing at least 90% lithium by weight) as the primary electrochemically active material;

capacity—the capacity delivered by a single electrode or an entire cell during discharge at a specified set of conditions (e.g., drain rate, temperature, etc.); typically expressed in milliamp-hours (mAh) or milliwatt-hours (mWh) or by the number of minutes or images taken on the digital still camera test;

cathode—the positive electrode; more specifically, in a lithium-iron disulfide cell, it comprises iron disulfide as the primary electrochemically active material, along with one or more rheological, polymeric and/or conductive additives, coated onto a solid, metallic foil current collector;

cell housing—the structure that physically encloses the electrode assembly, including all internally enclosed safety devices, inert components and connecting materials which comprise a fully functioning battery; typically these will include a container (formed in the shape of a cup, also referred to as a "can") and a closure (fitting over the opening of the container and normally including venting and sealing mechanisms for impeding electrolyte egress and moisture/atmospheric ingress); depending upon the context may sometimes be used interchangeably with the terms can or container;

cylindrical cell size—any cell housing having a circular-shaped cylinder with a height that is greater than its diameter; this definition specifically excludes button cells, miniature cells or experimental "hockey puck" cells;

Digital Still Camera Test (also referred to as the ANSI Digital Still Camera Test or the DSC test)—the testing procedure outlined in ANSI C18.3M, Part 1-2005 published by the American National Standard for Portable Lithium Primary Cells and Batteries—General and Specifications and entitled, "Battery Specification 15LF (AA lithium iron disulfide), Digital camera test";

electrochemically active material—one or more chemical compounds that are part of the discharge reaction of a cell and contribute to the cell discharge capacity, but including impurities and small amounts of other moieties inherent to the material;

FR6 cell—With reference to International Standard IEC-60086-1 published by the International Electrotechnical Commission on after November 2000, a cylindrical cell size lithium iron disulfide battery with a maximum external height of about 50.5 mm and a maximum external diameter of about 14.5 mm;

FR03 cell—With reference to International Standard IEC-60086-1 published by the International Electrotechnical Commission on after November 2000, a cylindrical cell size lithium iron disulfide battery with a maximum external height of about 44.5 mm and a maximum external diameter of about 10.5 mm;

"jellyroll" (or "spirally wound") electrode assembly—strips of anode and cathode, along with an appropriate polymeric separator, are combined into an assembly by winding along their lengths or widths, e.g., around a mandrel or central core;

pyrite—a preferred mineral form of iron disulfide for electrochemical cell applications, typically containing at least 95% electrochemically active iron disulfide when used in batteries, but also encompassing natural or deliberate variations to the stoichiometric composition of iron disulfide (i.e., minor amounts of other iron sulfides and/or doped metal sulfides may be present).

The inventor has observed that, when multiple prior art lithium-iron disulfide batteries having spirally wound electrode assemblies and substantially identical cell designs, components, electrode and electrolyte formulations and other raw materials are tested (and particularly FR6 and FR03 cells), the batteries tend to exhibit variable performance on intermittent drain rate tests, as will be described in greater detail below. This variability is particularly noticeable for batteries wherein the outermost wind of the jellyroll includes more cathode than anode (i.e., more cathode is present in the outermost layer of electrode of the jellyroll as compared to anode, although the final assembly may still be wrapped in a protective film or separator layer). Such cells are described as having a "cathode outer wrap" cell design, and but for their variability on intermittent tests, such cathode outer wrap designs would be considered advantageous owing to their more efficient utilization of lithium in comparison to an "anode outer wrap" cell designs (wherein the outermost electrode along the circumference of the jellyroll, excluding separator and other non-active components such as tape, is at least 50% or more of anode).

Figure 2A:
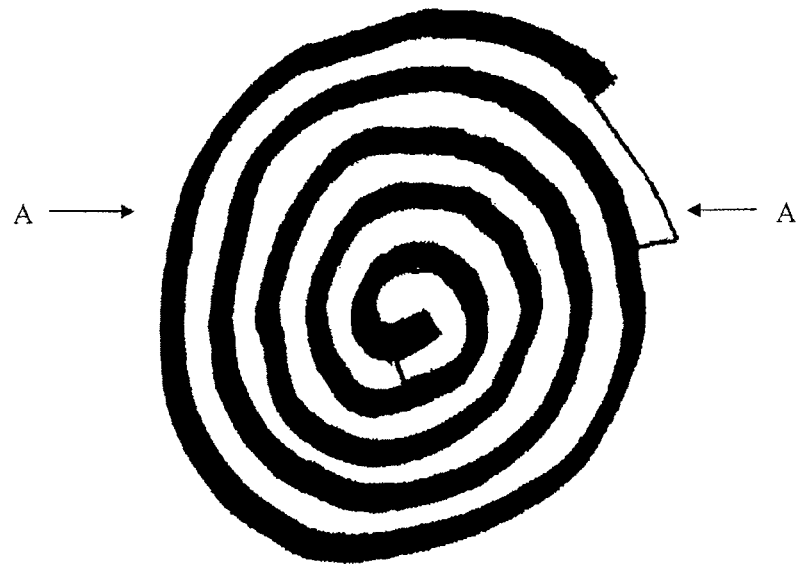
FIGS. 2A and 2B illustrate radial cross sections of a jellyroll electrode assembly, with FIG. 2A showing a cathode outer wrap design and FIG. 2B showing an anode outer wrap jellyroll configurations.
Figure 2B:
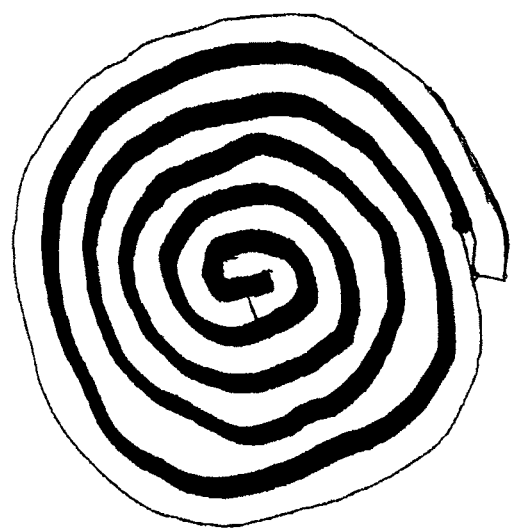

One example of a cathode outer wrap cell design is illustrated in a cross sectional view (i.e., taken along a radius of the jellyroll) in FIG. 2A, while FIG. 2B shows an anode outer wrap design. In both FIGS. 2A and 2B, the cathode is shown in black and the anode in white, while the remaining elements of the cell (as described below) are omitted to better illustrate the difference in design. As used herein, a cathode outer wrap design and cell includes any jellyroll electrode assembly wherein at least 50% of the surface area on the outermost circumference of the jellyroll is attributable to the cathode, either by way of cathode coating or, in situations where "patterned" coating is utilized, exposed cathode current collector. In identifying whether the cell is anode outer wrap or cathode outer wrap, any separator, leads, insulating tape and other inactive component(s) are not considered, and instead the outermost circumference of the jellyroll is assessed solely on the basis of the outermost portions of anode and cathode that are or would be exposed. Also, as used herein, a lead is considered a separate component as compared to a current collector, insofar as a lead establishes electrical contact between the electrode assembly and the terminal of the battery, while a current collector is used only within the electrode assembly itself (e.g., a current collector conducts electrons to the lead).

With respect to the advantages of cathode outer wrap cells, the inventor has observed that on 200 mA continuous drain rate tests, cathode outer wrap cell designs actually exhibit greater capacity than their corresponding anode outer wrap design as shown in FIG. 1. In FIG. 1, cells with an anode outer wrap exhibit the voltage discharge profile are indicated by the group of lines labeled AOW and cathode outer wrap cells are labeled COW. In addition to this performance benefit on a continuous drain rate test, cathode outer wrap designs more effectively utilize the lithium, which is more economical (because lithium is one of the most expensive components in an FR6 cell) and environmentally beneficial (because less overall lithium is left in discharged cell).

However, the advantages of cathode wrap cells are not observed when the batteries are subjected to intermittent drain rate tests. Such intermittent drain rate tests are considered extremely useful because they most closely simulate the actual usage of batteries by consumers in electronic devices (i.e., consumers often use devices intermittently over a long period of time, rather than continuously). Thus, the failure of a battery design to perform adequately on an intermittent test may be a considerable disincentive to use that design.

Figure 3A:
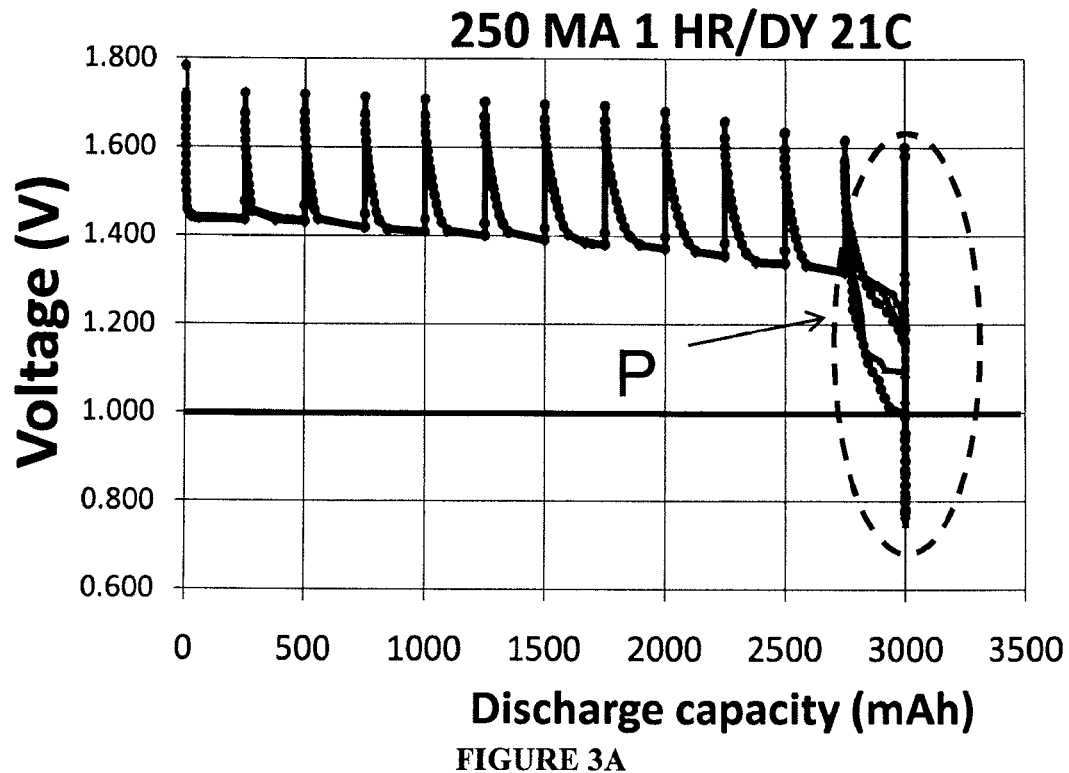
FIGS. 3A, 3B, 4A, 4B, 5A, 5B and 5C illustrate discharge profiles for various prior art lithium-iron disulfide cell designs on a variety of intermittent discharge tests.
Figure 3B:
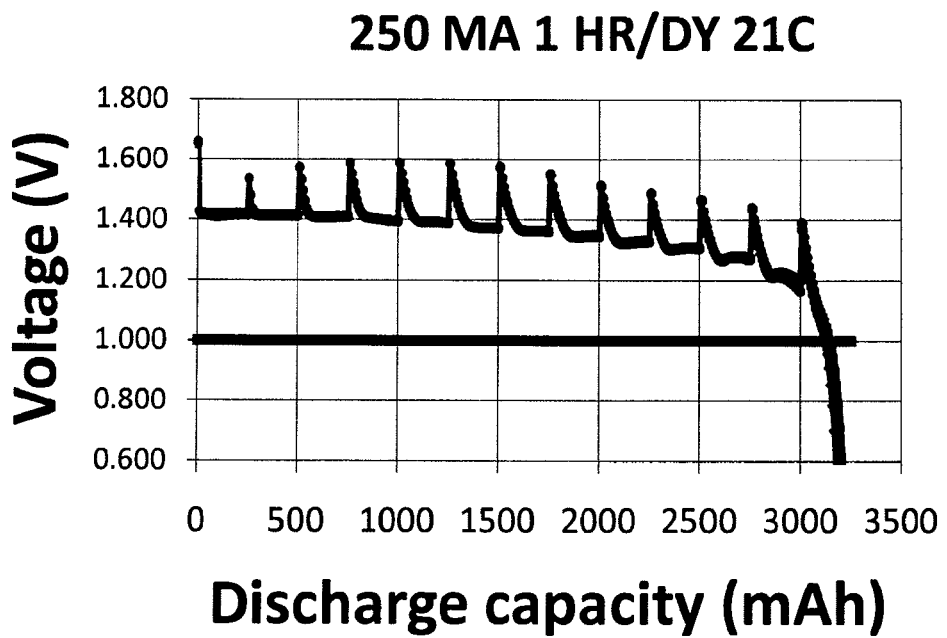

FIG. 3A shows the voltage discharge curves on an intermittent test for a series of FR6 cells having a cathode outer wrap. This particular intermittent test involved a constant current discharge of 250 mA for one hour, followed by a 23 hour rest interval, conducted to a 1.0 voltage cutoff. As highlighted by reference element P, the individual voltage profiles for these cells diverge at the end of this intermittent test, which may be collectively referred to hereafter as premature voltage drop-off. Significantly, anode outer wrap cells, having identical materials, did not experience this variation as seen in FIG. 3B. The effect was even more pronounced for the intermittent test shown in FIGS. 4A (showing the cathode outer wrap) and 4B (showing the anode outer wrap), where the cells were discharged for one hour per day at a cycle of 10 seconds of a 1 A discharge followed by 50 seconds of rest (note that the remaining 23 hours were also a rest interval) to a 1.0 cutoff voltage.

Figure 4A:
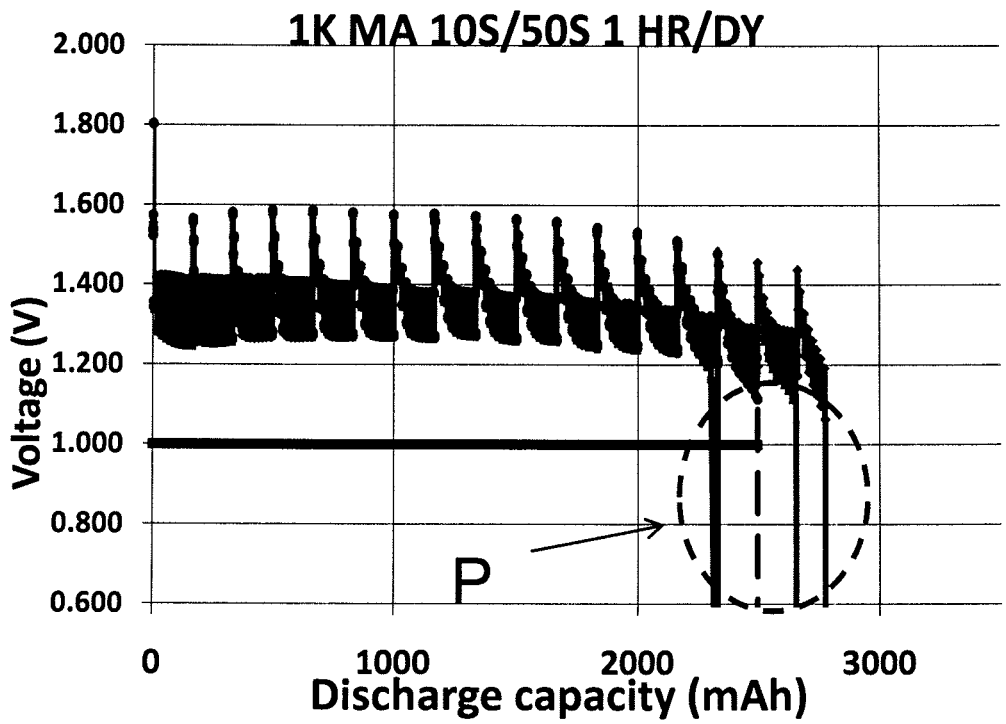
Figure 4B:
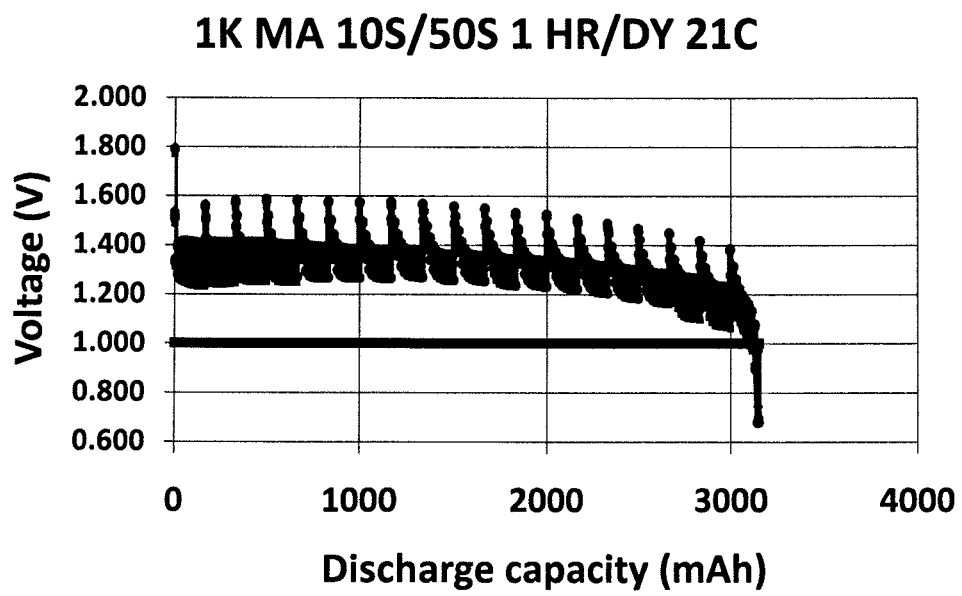
Figure 5A:
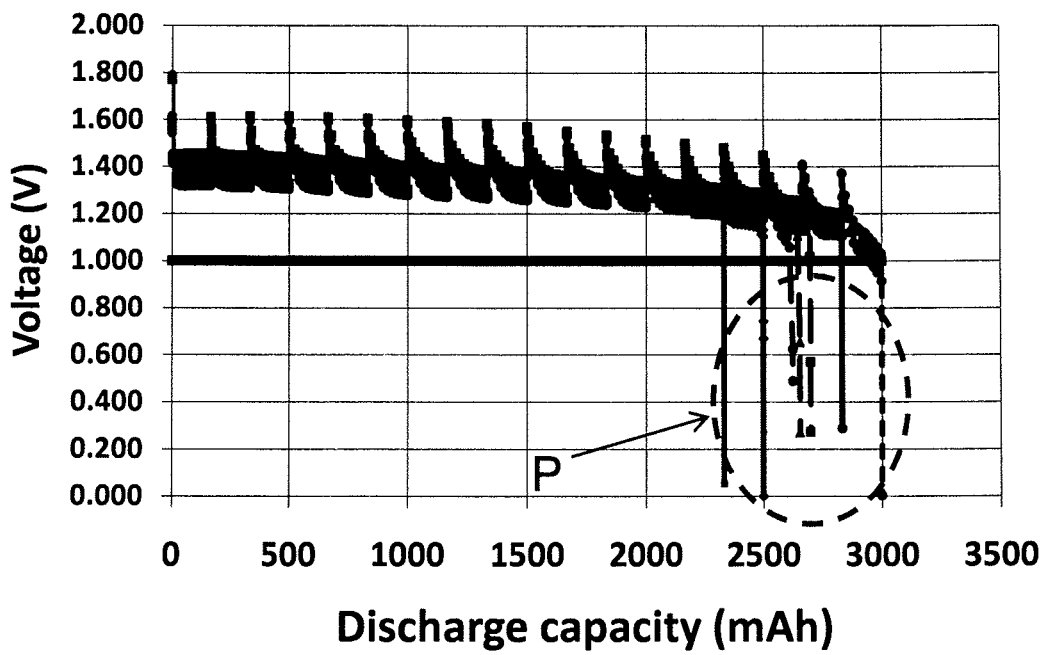
Figure 5B:
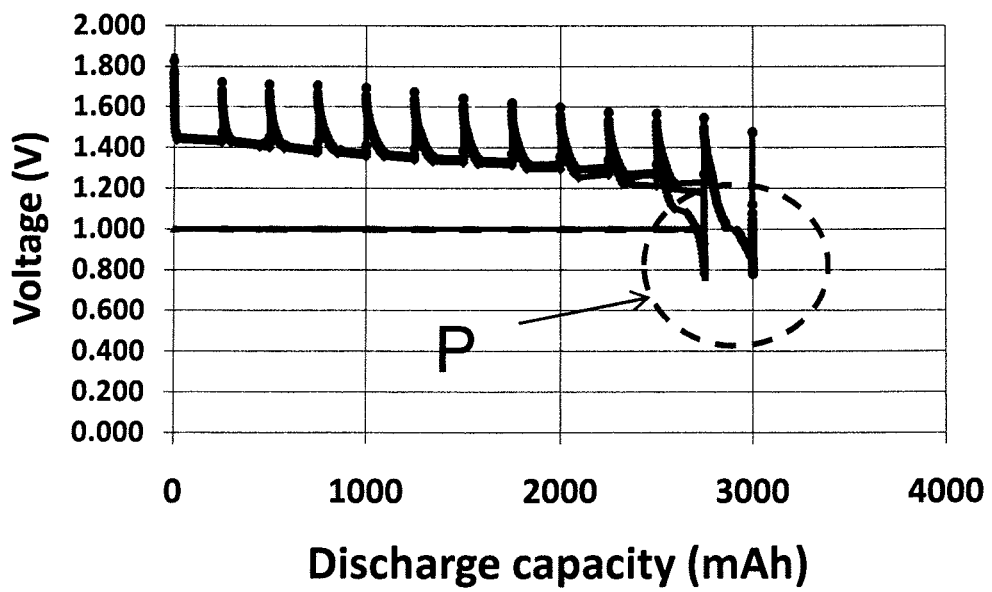
Figure 5C:
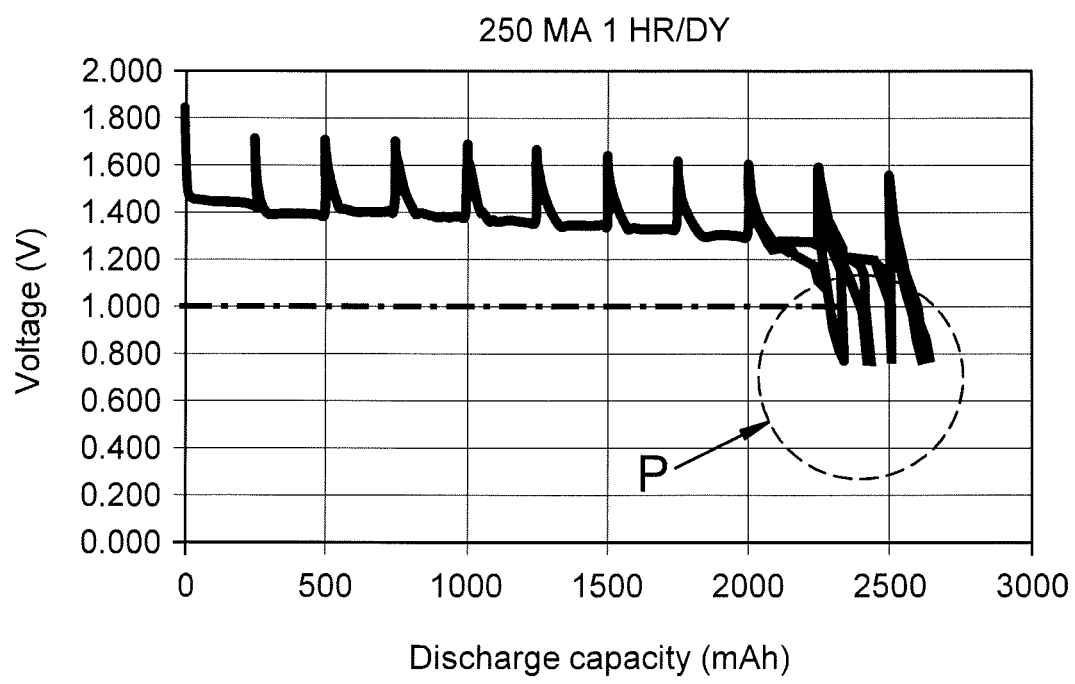

The inventor further confirmed that several prior art, commercially available FR6 batteries having a cathode outer wrap design exhibited this behavior, as evidenced by problem area P illustrated in FIG. 5A (showing an intermittent test identical to that described for the cells of FIGS. 4A and 4B) and in FIGS. 5B and 5C (showing an intermittent test identical to that described for the cells of FIGS. 3A and 3B).

This premature voltage drop-off is inherently comparative and, to observe the premature voltage drop-off, the voltage discharge curves for a plurality of presumably identical cells must be compared. Insofar as the ultimate goal of a battery manufacturer—and the ultimate indicator of quality for any cell design—is consistency and reliability for all batteries produced according to a single design, at least four cells should be subjected to the intermittent tests described herein in order to confirm the observed effect. More preferably the performance of a set of 6 to 10 cells should be compared relative to one another. A deviation of greater than 5% of total expected rating capacity at the stated voltage cutoff, and more definitively a deviation of greater than a 10%, indicates a systemic design failure on intermittent testing. This is the preferred means of identifying premature voltage drop-off.

In the event this type of test is not possible, separate means of identifying premature voltage drop-off may include comparing the average total capacity and voltage discharge curves/profiles for a plurality of cathode outer wrap cells against a similar number of anode outer wrap cells possessing the same amount of lithium. Yet another means might be to compare the lithium utilization, as described and shown in FIG. 10 below. Still another indicator to demonstrate elimination of the premature voltage drop-off is a simple, qualitative comparison of the shape of the individual discharge curves themselves, insofar as cells experiencing premature voltage drop off tend to display erratic or inconsistent profiles. Lastly, a comparison of a single cell's actual delivered capacity on an intermittent drain test against the manufacturer's stated capacity may be sufficient to confirm the presence of the premature voltage drop-off problem.

Although cathode outer wrap designs for FR6 and FR03 cells are currently available, all of these cell designs presently experience the premature voltage drop-off problem on intermittent discharge tests, as noted above and as shown in FIGS. 5A through 5C. As a result, anode outer wrap for FR6 and FR03 cells are the predominant and most widely available cell design on the market today. In either case (i.e., anode or cathode outer wrap design), the electrodes, and particularly the anode, have a substantially uniform thickness because of its ease of manufacture and the fact that this arrangement maintains the lowest possible internal resistance throughout the discharge of that cell. Use of a variable thickness electrode, particularly where the electrodes are interfacially aligned, ultimately results in a waste of active materials, the potential for unwanted increases to internal resistance owing to a change in discharge interfacial surface area and an increase the complexity of the design and manufacture. As such, variable thickness anode and/or cathode cell designs are not considered desirable, at least with respect to lithium-iron disulfide spirally wound batteries. In fact, the inventor is unaware of any commercially available or viable FR6 or FR03 cells which utilize this variable thickness design.

The inventor has now discovered a means for eliminating variability in the performance of cathode outer wrap lithium-iron disulfide cell designs on all intermittent discharge tests. One embodiment involves applying a small "patch" of lithium onto the anode at the point underneath the cathode along its outermost wind. This patch effectively increases the thickness of the anode at that particular point. The patch may extend completely across the width of the anode, and possibly even out of the top or the bottom of the jellyroll electrode assembly (i.e., along an axial direction relative to the jellyroll assembly) when the patch is also used as the anode tab. The length and volume/surface area of the patch should still be minimized to simplify manufacture and, surprisingly, to increase the overall utilization of lithium within the cell. In a related embodiment, the patch may be reinforced with a polymeric material to simplify its handling during the manufacture of the cell, although in this case the lithium forming the patch must still be at least partially in direct physical contact with both the anode and the separator that is interfacial to the anode.

The patch must be positioned along a line, preferably oriented along of the axis of the cylindrical electrode assembly, so as to be underneath the terminal edge of the cathode. Optionally, the patch may extend beyond this edge so as to be exposed on the outermost wind/circumference of the jellyroll electrode assembly. This arrangement insures that the benefits of the patch are fully realized. Alternatively, the patch can be applied to partially or completely overlap with the anode current collector (also referred to as "the anode tab" and described in greater detail below). In yet another embodiment, the patch may be covered entirely by the cathode when the patch itself also serves as the anode tab.

The anode tab, when not constructed from lithium, should be situated on the outermost wind of the jellyroll, near the terminal edge of the cathode, along the outermost wind of anode within the jellyroll. When the anode tab itself is constructed from lithium (or another active material or alloy thereof), the patch may be located proximate to the terminal edge of the cathode or the patch may be completely covered by the outermost wrap of cathode. Significantly, the efficacy of the patch is unaffected regardless of whether the cathode is completely coated on both sides or if a part of one or both sides is uncoated (i.e., a "patterned" cathode, similar to that described in United States Patent Publication No. 2008-0026293-A1, which is incorporated by reference herein).

Another embodiment contemplates applying the patch in the form of lithium adhered to a substrate, such as a polymer backing. This approach simplifies manufacturing by allowing the lithium patch to be pressure welded or bonded without having to extrude the anode in disproportionate thicknesses and/or without having to handle and apply a small amount of lithium. Any polymer that is non-reactive with the internal components of the cell, and particularly the electrolyte solvent(s), the electrolyte solute(s) and lithium, would suffice. The substrate material should also be relatively thin, preferably thinner than the lithium applied to it as a patch and more preferably as thin as possible. By way of example rather than limitation, polymers may include: any polymeric material appropriate for use as a separator, polyolefins, polyethylene, polypropylene, polyimide, polyesters and the like. Other substrate materials, such as metallic foils, woven materials and the like are also possible. Such a polymer backed patch may be particularly useful when the patch is used as the anode tab itself, although in such cases it is necessary that the patch/tab has sufficient axial length to extend beyond the jellyroll and make sufficient electrical contact with the container or terminal cover assembly.

In one embodiment, the patch is preferably an electrochemically active material, as this will insure that the material is compatible with other cell internal components. More preferably, the patch is lithium or a lithium alloy. Most preferably, the patch is made from the same material as the remainder of the anode. The patch material should also have a conductivity comparable or compatible to that of the corresponding anode material.

The patch should possess a thickness that is at least about one half the thickness of the anode itself. For example, if the anode is constructed from 150 micron thick lithium-aluminum alloy, the patch should be at least 75 microns thick. The maximum thickness of the patch should not interfere with the ability to wind and handle the final jellyroll, preferably. Preferred thicknesses, expressed as a function of the thickness of the base anode are at least 50%, at least 60%, at least 75% and at least 100%. Also, it may be possible, through the extrusion process used to form the base anode and/or through other mechanical processes employed during winding of the jellyroll electrode assembly, to form an integral area of localized thickness in the base anode that will serve as the lithium patch.

The length (the longer of the x-y directions) of the patch should be designed according to the interfacial (i.e., overlapping with both anode and cathode) width (i.e., linear direction along an axis of the cylindrical jellyroll) of the electrodes. Preferably, the length matches the interfacial width of the electrodes or it is between 50% to 100% of the interfacial width of the electrodes. If the patch will also serve as the anode tab itself, the length will be sufficient to fold around the outside of the jellyroll and establish contact with the container (thereby making the patch substantially longer the interfacial width of the electrodes). The width of the patch should be kept to a minimum, but in all cases the width of the patch must overlap with and extend beyond the terminal edge created by the cathode. For example, the width should not exceed at least 1 mm, at least 5 mm, at least 10 mm or at least 20 mm, but should be no greater than 50 mm, 30 mm or 10 mm. Alternatively, the width of the patch can be expressed as a function of the percentage of the circumference of the anode wind which it occupies or as a function of the size of the mandrel itself. For example, the width should be less than 20%, less than 15%, less than 10% and less than 5% of the circumference of the wind or at least as large, at least 1.5 times larger, at least 2 times larger or at least 4 times larger than the diameter of the mandrel/core used to wind the cell. Ultimately, the thickness, length and the width will depend upon the cell size selected, as well as the manufacturing tolerances and processes employed to wind the cells.

Alternatively, the patch may comprise a series of individual elements, such as a series of circular (or other geometrically shaped) dots, aligned in a substantially linear arrangement along the anode surface in any of the positions indicated above. In this embodiment, the dots may touch and/or overlap with one another, or they may be spaced apart from one another, preferably by no more than two times the maximum radius of the shape(s) adjacent to the spacing gap. Irregular or non-matching shapes may also be used.

Figure 2C:
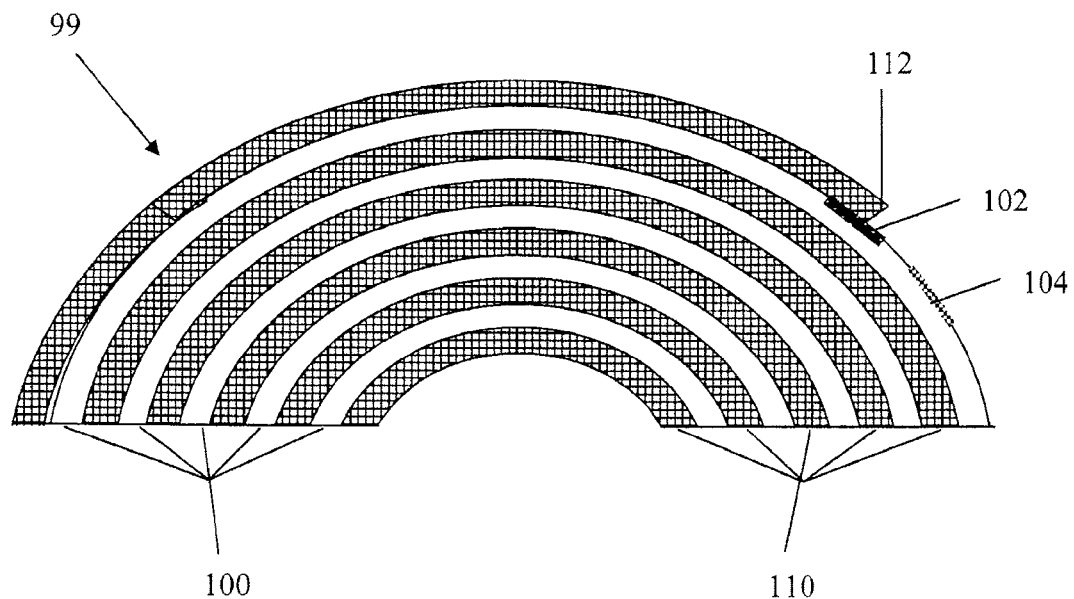
Figure 2D:
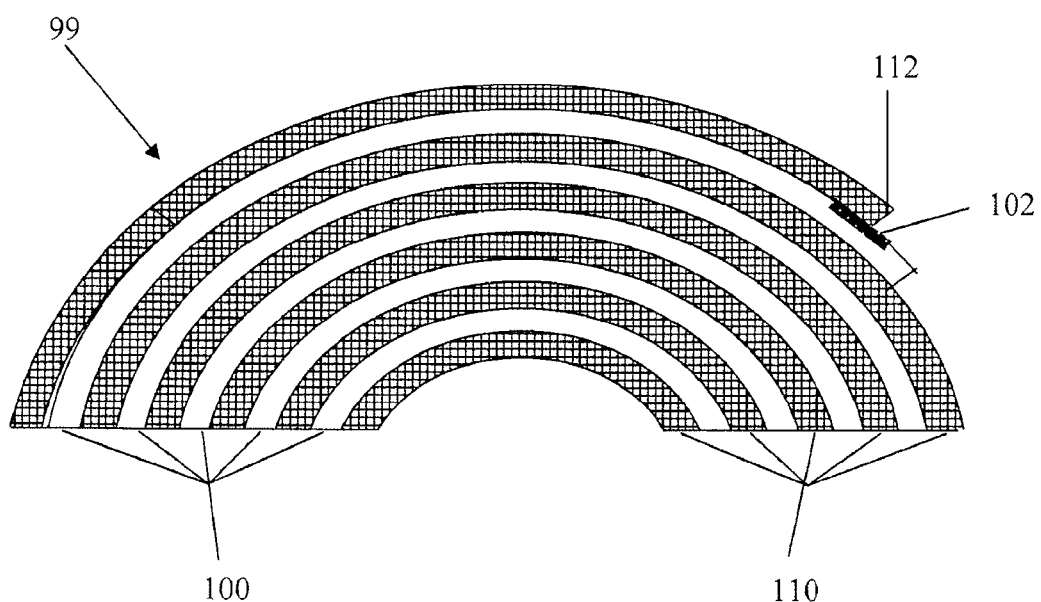
FIGS. 2D and 2E illustrate preferred locations when the lithium patch also serves as the anode tab.
Figure 2E:
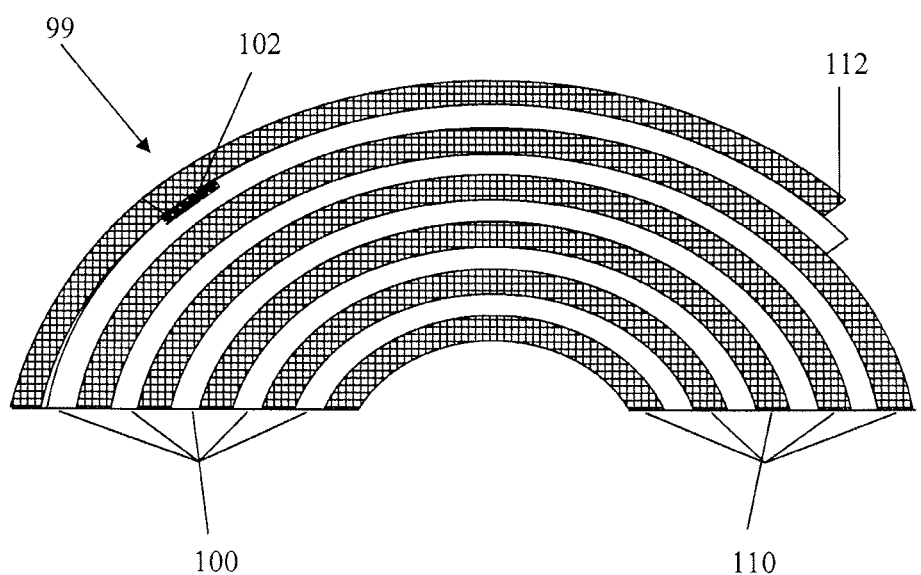

Preferred locations in the jellyroll electrode assembly 99 for the lithium patch 102 are illustrated in FIGS. 2C, 2D and 2E. Note that FIGS. 2C, 2D and 2E are only partial cross-sectional views of the jellyroll. With respect to FIG. 2C, the partial cross-section is taken along line A-A in FIG. 2A.

As seen in FIG. 2C, the patch 102 may be applied to the anode 100 underneath the terminal edge 112 of the cathode 110 when the anode tab 104 is located beyond the terminal edge 112 (i.e., on the outer most surface of the jellyroll assembly 99) on a portion of the anode that is exposed along the outermost surface of the jellyroll. In this instance, the anode tab 104 and the patch 102 are located in the outermost wind of anode within the jellyroll.

Alternatively, if the patch also serves as the anode tab, the combined patch-tab 103 may be situated partially or completely underneath the cathode 110. For example, in FIGS. 2D and 2E, a preferred locations are shown when the combined patch-tab 103 also serves as the anode tab. Note that in these latter embodiments, the absence of a separate anode tab permits the terminal edge of the anode (i.e., the portion exposed to the outermost surface of the jellyroll) to be minimized, and it may be possible to completely eliminate anode from the outermost wind in these embodiments (not illustrated). Additionally, the combined patch-tab 103 in these embodiments need not be located in the outermost wind of the anode within the jellyroll.

Although not intending to be bound any particular theory, the inventor believes the patch may help to retain the integrity of the anode as the cathode expands during discharge. In particular, jagged edges may be formed on the anode tab and, more likely, on the terminal edge of the current collector foil used in the cathode. Although the leading terminal edge of the cathode is usually isolated within the winding core (and therefore not subject to the proposed mechanisms described herein), the outer terminal edge of the cathode remains exposed. Due to iron disulfide's propensity to expand volumetrically during discharge, this exposed terminal edge (and/or edges of the anode tab) is compressed against the container sidewall, which creates a potential "pinch point". This pinch point serves to partially or completely penetrate the separator and/or sever the lithium anode that is interfacially aligned with/proximate to it during discharge. The effect is exacerbated by sporadic or non-constant discharge (as during intermittent discharge) because the pinch point is repeatedly relaxed and then stressed in a way that may maximize the potential "severing" force of the sharp edges.

Because a full-length anode current collector is not used in the anode (particularly in commercially available lithium-iron disulfide cylindrical cells) in order to maximize the amount of active material in the cell, severing the anode at any point would isolate the severed material from the anode tab/negative terminal, thereby eliminating the capacity normally anticipated from the severed portion. Depending upon the location of the anode tab, the thickness of the electrodes and the level of cathode expansion, the disconnect may occur or impact additional proximate sections of the electrode assembly (i.e., the severed/impacted material may be along more than just the outermost wind of the anode). Additionally or alternatively, it is believed that the patch may impart added conductivity to a region of the anode where concentrated or elevated current density may be experienced based upon the cut edge of the cathode current collector. As a final additional or alternative cause, the relatively jagged terminal edge of the cathode (and/or possibly the anode) may some cause or contribute to a localized area of increased electrochemical reactivity and/or impairment the electrode assembly's ability to realize the full interfacial input capacities provided thereto.

The use of a patch as described above is expected to mitigate any of these proposed mechanisms. Indeed, application of a patch almost imperceptibly increases the amount of input capacity in an extremely small and localized area while substantially increasing the overall capacity actually delivered (and, by extension, the utilization of the lithium) by the cell on intermittent tests. In comparison to anode outer wrap designs with the same amount of lithium input, improvements of at least 7% on high rate and ANSI tests can be realized when using the patch in combination with the cathode outer wrap. Additional benefits may be realized in terms of the expense and ease of manufacturing the resulting cell, particularly as described in the examples below.

In a related application which is incorporated by reference herein, U.S. patent application Ser. No. 12/253,516 filed on Oct. 17, 2008 and published as United States Patent Publication 2009-0104520-A1, a "holistic" approach to cell design for $LiFeS_2$ batteries is disclosed. In particular, this patent publication informs the artisan to select container and cathode formulations in a manner that efficiently accommodates the expected expansion. In so doing, the overall cell experiences increased capacity without any deleterious effects upon safety or reliability.

Another related application which is also incorporated by reference herein, U.S. patent application Ser. No. 12/480,015 filed on Jun. 8, 2009, also discloses a cell design for $Li\text{—}FeS_2$ batteries. Here, the battery is constructed with relatively thicker electrodes, and a synergistic effect is realized through the combined use of a particular type of electrolyte material and a cathode coating of a particular compaction. Although this cell design incorporates a much smaller interfacial surface area than previous designs, beneficial effects at high drain rates are observed.

Both of the aforementioned patent applications describe cell design principles that may have particular applicability to the inventive concepts described below.

Figure 6:
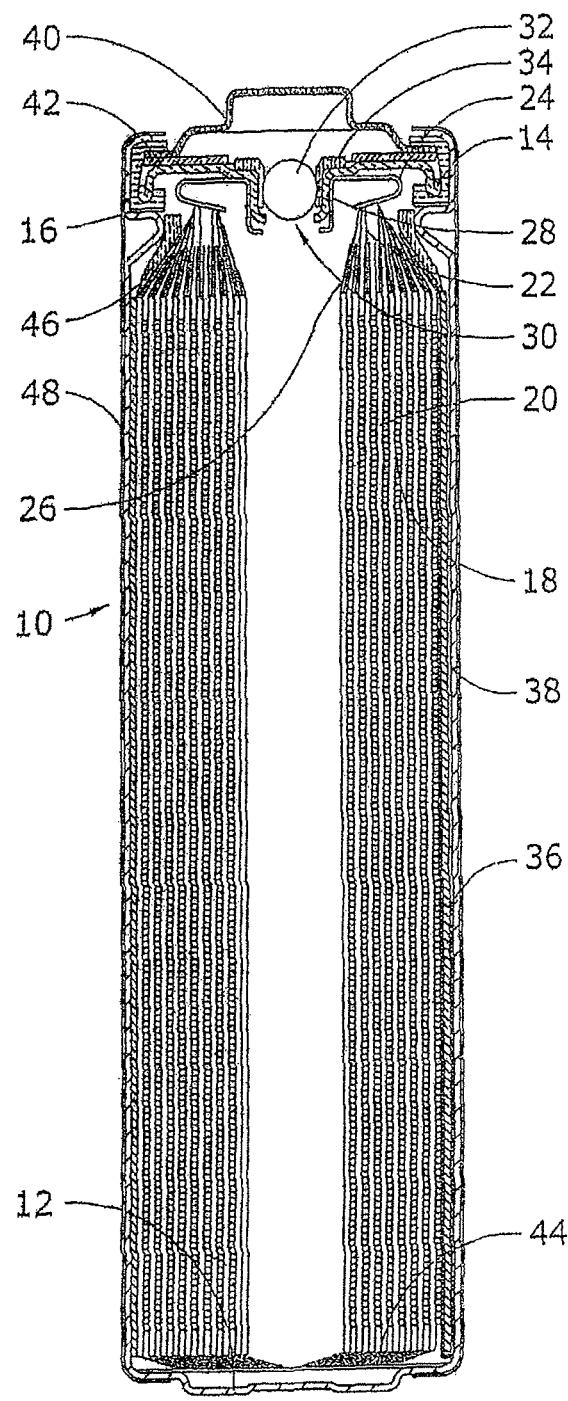
FIG. 6 illustrates one embodiment of a cell design for a lithium-iron disulfide electrochemical cell.

More generally with respect to the overall cell design itself, the invention will be better understood with reference to FIG. 6. In FIG. 6, the cell 10 is one embodiment of a FR6 (AA) type cylindrical $LiFeS_2$ battery cell, although the invention should have equal applicability to FR03 (AAA) or other cylindrical cells. The cell 10 has, in one embodiment, a housing that includes a container in the form of can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode or negative electrode 18, a cathode or positive electrode 20 and electrolyte within the cell 10.

The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal lead (or tab) 36. The lead 36 is fastened to the anode 18, extends from the bottom of the electrode assembly, and is folded across the bottom and up along the side of the electrode assembly. The lead 36 makes pressure contact with the inner surface of the side wall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example.

In one embodiment, an insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12.

In one embodiment, the cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the side wall of the can 12.

In one embodiment, disposed between the peripheral flange of the terminal cover 40 and the cell cover 14 is a positive temperature coefficient (PTC) device 42 that substantially limits the flow of current under abusive electrical conditions. In another embodiment, the cell 10 may also include a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10. In other embodiments, the pressure relief vent can be an aperture closed by a rupture membrane, such as disclosed in U.S. Patent Application Publication Nos. 20050244706 and 20080213651, which are incorporated by reference, or a relatively thin area such as a coined groove, that can tear or otherwise break, to form a vent aperture in a portion of the cell, such as a sealing plate or container wall.

In one embodiment, the terminal portion of the electrode lead 36, disposed between the side of the electrode assembly and the side wall of the can, may have a shape prior to insertion of the electrode assembly into the can, preferably non-planar that enhances electrical contact with the side wall of the can and provides a spring-like force to bias the lead against the can side wall. During cell manufacture, the shaped terminal portion of the lead can be deformed, e.g., toward the side of the electrode assembly, to facilitate its insertion into the can, following which the terminal portion of the lead can spring partially back toward its initially non-planar shape, but remain at least partially compressed to apply a force to the inside surface of the side wall of the can, thereby making good physical and electrical contact with the can. Alternatively, this connection, and/or others within the cell, may also be maintained by way of welding.

The cell container is often a metal can with a closed bottom such as the can in FIG. 6. The can material and thickness of the container wall will depend in part of the active materials and electrolyte used in the cell. A common material type is steel. For example, the can may be made of cold rolled steel (CRS), and may be plated with nickel on at least the outside to protect the outside of the can from corrosion. Typically, CRS containers according to the invention can have a wall thickness of approximately between 7 and 10 mils for a FR6 cell, or 6 to 9 mils for a FR03 cell. The type of plating can be varied to provide varying degrees of corrosion resistance, to improve the contact resistance or to provide the desired appearance. The type of steel will depend in part on the manner in which the container is formed. For drawn cans, the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover can be metal. Nickel plated steel may be used, but a stainless steel is often desirable, especially when the closure and cover are in electrical contact with the cathode. The complexity of the cover shape will also be a factor in material selection. The cell cover may have a simple shape, such as a thick, flat disk, or it may have a more complex shape, such as the cover shown in FIG. 6. When the cover has a complex shape like that in FIG. 6, a type 304 soft annealed stainless steel with ASTM 8-9 grain size may be used to provide the desired corrosion resistance and ease of metal forming. Formed covers may also be plated, with nickel for example, or made from stainless steel or other known metals and their alloys.

The terminal cover should have good resistance to corrosion by water in the ambient environment or other corrosives commonly encountered in battery manufacture and use, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket used to perfect the seal between the can and the closure/terminal cover may be made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene (e.g., PRO-FAX® 6524 from Basell Polyolefins in Wilmington, Del., USA) and polyphenylene sulfide (e.g., XTEL™ XE3035 or XE5030 from Chevron Phillips in The Woodlands, Tex., USA). Small amounts of other polymers, reinforcing inorganic fillers and/or organic compounds may also be added to the base resin of the gasket. Examples of suitable materials can be found in U.S. Patent Publication Nos. 20080226982 and 20050079404, which are incorporated by reference.

The gasket may be coated with a sealant to provide the best seal. Ethylene propylene diene terpolymer (EPDM) is a suitable sealant material, but other suitable materials can be used.

The anode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance or handling ease, although the amount of lithium in any alloy should nevertheless be maximized and alloys designed for high temperature application (i.e., above the melting point of pure lithium) are not contemplated. Appropriate battery grade lithium-aluminum foil, containing 0.5 weight percent aluminum, is available from Chemetall Foote Corp., Kings Mountain, N.C., USA. An anode consisting essentially of lithium or a lithium alloy (for example, 0.5 wt. % Al and 99+wt. % Li)

is preferred, with an emphasis placed on maximizing the amount of active material (i.e., lithium) in any such alloy.

As in the cell in FIG. 6, a separate current collector (i.e., an electrically conductive member, such as a metal foil, on which the anode is welded or coated, or an electrically conductive strip running along substantial portions the length of the anode such that the collector would be spirally wound within the jellyroll) is not needed for the anode, since lithium has a high electrical conductivity. By not utilizing such a current collector, more space is available within the container for other components, such as active materials. If used, an anode current collectors could be made of copper and/or other appropriate high conductivity metals that are stable when exposed to the other interior components of the cell (e.g., electrolyte).

The electrical connection is maintained between each of the electrodes and the opposing external battery terminals, which are proximate to or integrated with the housing. An electrical lead 36 can be made from a thin metal strip connecting the anode or negative electrode to one of the cell terminals (the can in the case of the FR6 cell shown in FIG. 6). This may be accomplished embedding an end of the lead within a portion of the anode or by simply pressing a portion such as an end of the lead onto the surface of the lithium foil. The lithium or lithium alloy has adhesive properties and generally at least a slight, sufficient pressure or contact between the lead and electrode will weld the components together. The negative electrode may be provided with a lead prior to winding into a jellyroll configuration. The lead may also be connected via appropriate welds.

The metal strip comprising the lead 36 is often made from nickel or nickel plated steel with sufficiently low resistance (e.g., generally less than 15 mΩ/cm and preferably less than 4.5 mΩ/cm) in order to allow sufficient transfer of electrical current through the lead. Examples of suitable negative electrode lead materials include, but are not limited to, copper, copper alloys, for example copper alloy 7025 (a copper, nickel alloy comprising about 3% nickel, about 0.65% silicon, and about 0.15% magnesium, with the balance being copper and minor impurities); and copper alloy 110; and stainless steel. Lead materials should be chosen so that the composition is stable within the electrochemical cell including the nonaqueous electrolyte.

The cathode is in the form of a strip that comprises a current collector and a mixture that includes one or more electrochemically active materials, usually in particulate form. Iron disulfide ($FeS_2$) is primary active material. The cathode can also contain small amounts of one or more additional active materials, depending on the desired cell electrical and discharge characteristics. The additional active cathode material may be any suitable active cathode material. Examples include metal oxides, $Bi_2O_3$, $C_2F$, $CF_x$, $(CF)_n$, $CoS_2$, CuO, CuS, FeS, $FeCuS_2$, $MnO_2$, $Pb_2Bi_2O_5$ and S. Preferably, the active material for a $Li/FeS_2$ cell cathode comprises at least about 95 weight percent $FeS_2$, and most preferably $FeS_2$ is the sole active cathode material. Pyrite having a purity level of at least 95 weight percent $FeS_2$ is available from Washington Mills, North Grafton, Mass., USA; Chemetall GmbH, Vienna, Austria; and Kyanite Mining Corp., Dillwyn, Va., USA. Note that the discussion of "purity" of $FeS_2$ acknowledges that pyrite is a specific and preferred mineral form of $FeS_2$. However, pyrite often times has small levels of impurities (typically silicon oxides) and, because only the $FeS_2$ is electrochemically active in pyrite, references to percent purity of $FeS_2$ are made with respect to the total amount of pyrite, usually on a weight percentage basis. Thus, pyrite and $FeS_2$ may not be synonymous when read in proper context. A more comprehensive description of the cathode, its formulation and a manner of manufacturing the cathode is provided below.

The cathode mixture is coated onto one or both sides of a thin metal strip which serves as the cathode current collector. Aluminum is a commonly used material, although titanium, copper, steel, other metallic foils and alloys thereof are also possible. The current collector may extend beyond the portion of the cathode containing the cathode mixture. This extending portion of the current collector can provide a convenient area for making contact with the electrical lead connected to the positive terminal, preferably via a spring or pressure contact that obviates the need for a lead and/or welded contacts. It is desirable to keep the volume of the extending portion of the current collector to a minimum to make as much of the internal volume of the cell available for active materials and electrolyte. Examples of typical coating configurations for the cathode can be found in U.S. Patent Publication No. 20080026293, which is incorporated by reference.

The cathode is electrically connected to the positive terminal of the cell. This may be accomplished with an electrical lead, often in the form of a thin metal strip or a spring, as shown in FIG. 6, although welded connections are also possible. If used, this lead can be made from nickel plated stainless steel or other appropriate materials. In the event an optional current limiting device, such as a standard PTC, is utilized as a safety mechanism to prevent runaway discharge/heating of the cell, a suitable PTC is sold by Tyco Electronics in Menlo Park, Calif., USA. A typical, standard PTC device generally comprises a resistance of approximately 36 mΩ/cm. Other alternatives, including lower resistance devices of approximately 18 mΩ/cm, are also available. Alternative current limiting devices can be found in U.S. Publication Nos. 20070275298 and 20080254343, which are incorporated by reference.

The separator is a thin macroporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

To provide good high power discharge performance, it is desirable that the separator have the characteristics (pores with a smallest dimension of at least about 0.005 μm and a largest dimension of no more than about 5 μm across, a porosity in the range of about 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference. Other desirable separator properties are described in U.S. Patent Publication No. 20080076022, which is hereby incorporated by reference.

Separators are often made of polypropylene, polyethylene or both. The separator can be a single layer of biaxially oriented microporous membrane, or two or more layers can be laminated together to provide the desired tensile strengths in orthogonal directions. A single layer is preferred to minimize the cost. The membrane should have a thickness between 16 and 25 microns, depending upon the cathode formulation and constraints on container strength disclosed herein. Suitable separators are available from Tonen Chemical Corp., available from EXXON Mobile Chemical Co., Macedonia, N.Y., USA and Entek Membranes in Lebanon, Oreg., USA.

A nonaqueous electrolyte, containing water only in very small quantities as a contaminant (e.g., no more than about 500 parts per million by weight, depending on the electrolyte salt being used), is used in the battery cell of the invention. The electrolyte contains one or more lithium-based electrolyte salts dissociated in one or more organic solvents. Suitable salts include one or more of the following: lithium bromide, lithium perchlorate, lithium hexafluorophosphate, potassium hexafluorophosphate, lithium hexafluoroarsenate, lithium trifluoromethanesulfonate and lithium iodide, although the salt preferably includes $I^-$ (e.g., by dissociation of LiI in the solvent blend). Suitable organic solvents include one or more of the following: methyl formate, γ-butyrolactone, sulfolane, acetonitrile, 3,5-dimethylisoxazole, n,n-dimethyl formamide and ethers, although at least 50 volume percent of the total solvents must be ether because its low viscosity and wetting capability appear to positively influence the thicker electrode constructions described below. Preferred ethers can be acyclic (e.g., 1,2-dimethoxyethane, 1,2-diethoxyethane, di(methoxyethyl)ether, triglyme, tetraglyme and diethyl ether) and/or cyclic (e.g., 1,3-dioxolane, tetrahydrofuran, 2-methyl tetrahydrofuran and 3-methyl-2-oxazolidinone). 1,3-dioxolane and 1,2-dimethoxyethane are the preferred solvents, while lithium iodide is the preferred salt, although it may be used in combination with lithium triflate, lithium imide or lithium perchlorate. Additives that result in the creation of $I^-$ dissociated in the solvent blend may also be used.

The anode, cathode and separator strips are combined together in an electrode assembly. The electrode assembly may be a spirally wound design, such as that shown in FIG. 6, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The anode can be the outermost electrode, as shown in FIG. 6, or the cathode can be the outermost electrode. Either electrode can be in electrical contact with the cell container, but internal short circuits between the outmost electrode and the side wall of the container can be avoided by matching the polarity of the outermost wind of the electrode assembly to that of the can.

The cell can be closed and sealed using any suitable process. Such processes may include, but are not limited to, crimping, redrawing, collecting and combinations thereof. For example, for the cell in FIG. 6, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold and retain the gasket, cover assembly, PTC device and terminal cover and complete the sealing of the open end of the can by the gasket.

With respect to the cathode, the cathode is coated onto a metallic foil current collector, typically an aluminum foil with a thickness between about 16 and 20 μm. The cathode is formed as a mixture which contains a number of materials that must be carefully selected to balance the processability, conductivity and overall efficiency of the coating. These components are mixed into a slurry in the presence of a solvent, such as trichloroethylene, and then coated onto the current collector. The resulting coating is preferably dried and densified after coating, and it consists primarily of iron disulfide (and its impurities); a binder to hold the particulate materials together and adhere the mixture to the current collector; one or more conductive materials such as metal, graphite and carbon black powders to provide improved electrical conductivity to the mixture; and various processing or rheological aids, such as fumed silica and/or an overbased calcium sulfonate complex. A preferred cathode formulation is disclosed in U.S. Patent Publication 20090104520, which is incorporated by reference.

Additionally, it has been determined that lithium-iron disulfide batteries intended for high rate applications inure benefits by providing an excess of theoretical interfacial input capacity in the cathode as compared to the theoretical interfacial input capacity of the anode associated therewith, as described in U.S. Pat. No. 7,157,185 which is incorporated by reference herein. Thus, in one embodiment, cells of the invention have an interfacial anode to cathode input ratio of less than 1.00, less than 0.95 or less than 0.90. Notably, the size the lithium patch is such that its contribution to cell capacity can be considered negligible.

The following are representative materials utilized in the preferred cathode formulation. between 94 wt. % to 99 wt. % pyrite, 0.1-3.0 wt. % conductor, about 0.1-3.0 wt. % binder, and about 0-1.0 wt. % processing aids. It is more desirable to have a cathode mixture with about 95-98 wt. % pyrite, about 0.5-2.0 wt. % conductor, about 0.5-2.0 wt. % binder, and about 0.1-0.5 wt. % processing aids. It is even more desirable to have a cathode mixture with about 96-97 wt. % pyrite, about 1.0-2.0 wt. % conductor, about 1.0-1.5 wt. % binder, and about 0.3-0.5 wt. % processing aids. The conductor may comprise PureBlack™ (carbon black) 205-110 from Superior Graphite Chicago, Ill. and/or MX15 from Timcal Westlake, Ohio. The binder/processing aids may comprise a polymeric binder comprising a styrene-ethylene/butylenes-styrene (SEBS) block copolymer, such as g1651 from Kraton Polymers Houston, Tex., and EFKA® 6950 overbased calcium sulfonate complex previously available from Ciba, Heerenveen, Netherlands or AEROSIL® 200 fumed silica from Evonik Industries AG, Essen, Germany.

It is also desirable to use cathode materials with small particle sizes to minimize the risk of puncturing the separator. For example, $FeS_2$ can be sieved, at least through a 230 mesh (62 μm) screen or smaller. More preferably, the $FeS_2$ may be media milled to have an average d50 particle size than 10 μm or less or processed, as described in U.S. Patent Publication No. 20050233214, which is incorporated by reference herein.

The cathode mixture is applied to the foil collector using any number of suitable processes, such as three roll reverse, comma coating or slot die coating. After or concurrent with drying to remove any unwanted solvents, the resulting cathode strip is densified via calendering or the like to further compact the entire positive electrode. In light of the fact that this strip will then be spirally wound with separator and a similarly (but not necessarily identically) sized anode strip to form a jellyroll electrode assembly, this densification maximizes loading of electrochemical material in the jellyroll electrode assembly. Particular advantages have been demonstrated in one embodiment of the invention when the cathode loading exceeds at least 28 mg of mix/cm$^2$ on one facing (i.e., one side) of the current collector.

However, the cathode cannot be over-densified as some internal cathode voids are needed to allow for expansion of the iron disulfide during discharge and wetting of the iron disulfide by the organic electrolyte. More practically, there are also operational limits as to the amount of force that can be applied to compact the coatings to high densities, and the stress on the current collector created by such forces can result in unwanted stretching and/or actual de-lamination of the coating. Therefore, it is preferable that the solids packing percentage in the final densified cathode must be sufficient to allow for the electrochemical reaction to proceed. Preferably, the final solids packing must be between about 58% and 70%.

In a fixed space, such as an FR6 can, the thickness of the electrodes impacts the amount of interfacial surface area. Thicker electrodes will result in fewer winds within the jellyroll. Additional processing and manufacturing difficulties may also occur; for example, the cathode mix formulation, coating and densification operations will all be impacted as the cathode thickness increases, as will the jellyroll winding when the electrode thickness changes. Consequently, it may be desirable to maintain a jellyroll interfacial area of about 200 to 220 cm$^2$ in an FR6 cell, which corresponds to an anode thickness between 140 and 165 microns, a separator thickness between 16 to 25 microns and a cathode thickness between 180 and 220 microns (inclusive of the current collector).

The amount of FeS$_2$ in the cathode coating can either be determined by analyzing the mixture prior to fabrication of the battery or by determining the iron content post-formulation and correlating the detected level of iron to the weight percentage of pyrite in the cathode. The method of testing for iron content post-fabrication can be conducted by dissolving a known amount (in terms of mass and volume/area) of cathode in acid, then testing for the total amount of iron in that dissolved sample using common quantitative analytical techniques, such as inductively coupled plasma atomic emission spectroscopy or atomic absorption spectroscopy. Testing of known coated cathode formulations according to this method have verified that the total amount of iron is representative of FeS$_2$ in the cell (particularly to the extent that is desirable to maximize the purity of FeS$_2$ in the cathode coating). It may also be possible to determine cathode density using a pycnometer, although certain binders may experience volumetric changes when exposed to the internal environment of a lithium-iron disulfide cell such that the density established by such methods may need to be adjusted further in order to arrive at the cathode dry mix density.

Notably, testing for the quantity of aluminum in the sample will allow for calculation of the thickness of the current collector (when the collector is aluminum) in a similar manner (e.g., ICP-AES or AA spectroscopy). Other similar analytical techniques may be employed to test for binders, processing aids and the like, depending upon the atomic and/or molecular composition of those components, and analysis of the anode and/or separator is possible using similar analytical and quantitative/qualitative techniques.

Non-destructive imaging techniques, such as computer-aided tomography, x-rays and the like may be useful in determining the construction of the cell (anode outer wrap versus cathode outer wrap), as well as other features described herein, specifically including the presence and location of a patch 102. Additionally or alternatively, actual cell autopsies may be performed. Common analytical techniques, including normalized gravimetric analysis, dimensional measurements, inductively coupled plasma spectroscopy or gas chromatography-mass spectroscopy, may also be informative in determining the construction and features of a particular cell.

The entirety of the above description is particularly relevant to FR6 and FR03 cells. However, the invention might also be adapted to other cylindrical cell sizes where the sidewall height exceeds the diameter of the container, cells with other cathode coating schemes and/or seal and/or pressure relief vent designs.

Features of the invention and its advantages will be further appreciated by those practicing the invention. Furthermore, certain embodiments of the components and the performance of the cell assembled as described will be realized. It will be understood by those who practice the invention and those skilled in the art that various modifications and improvements may be made to the invention without departing from the teachings of the disclosed concepts. The scope of protection afforded is to be determined by the claims and by the breadth of interpretation allowed by law.

The invention will now be described with reference to the following non-limiting examples.

EXAMPLE

Figure 7A:
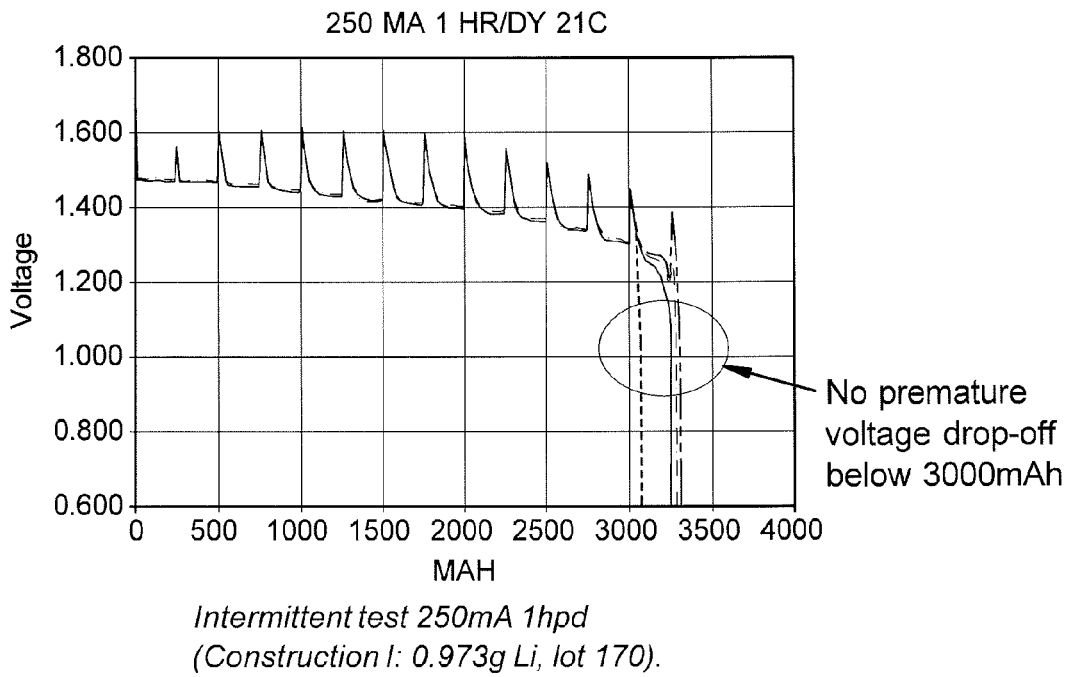
FIGS. 7, 8 and 9 illustrate the voltage discharge profiles of cells incorporating one embodiment of the invention on a variety of intermittent discharge tests.
Figure 7B:
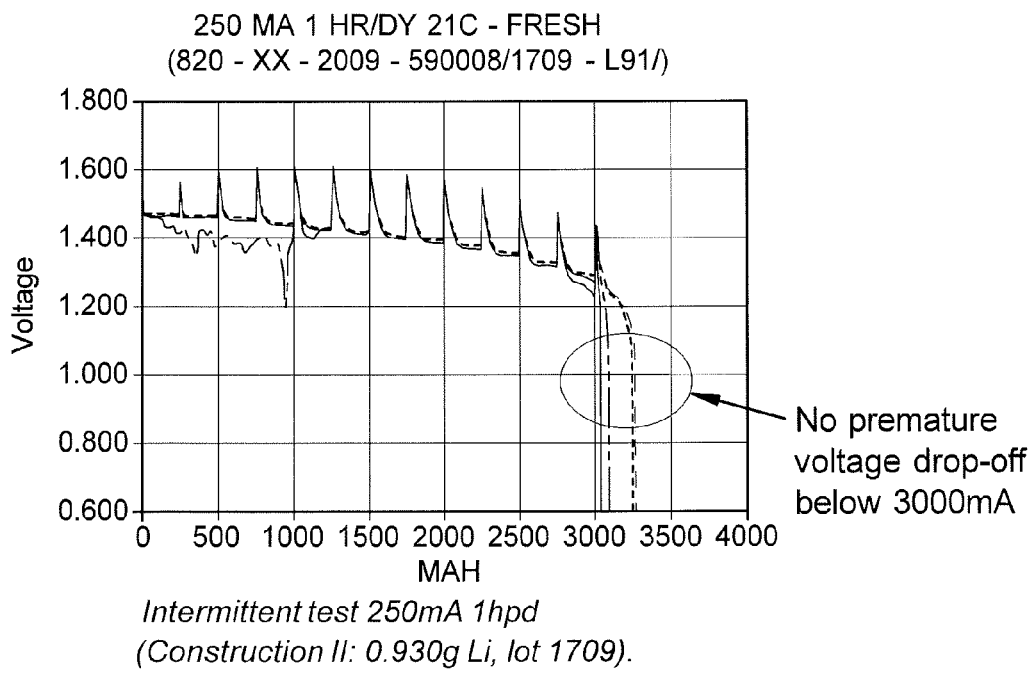
Figure 8A:
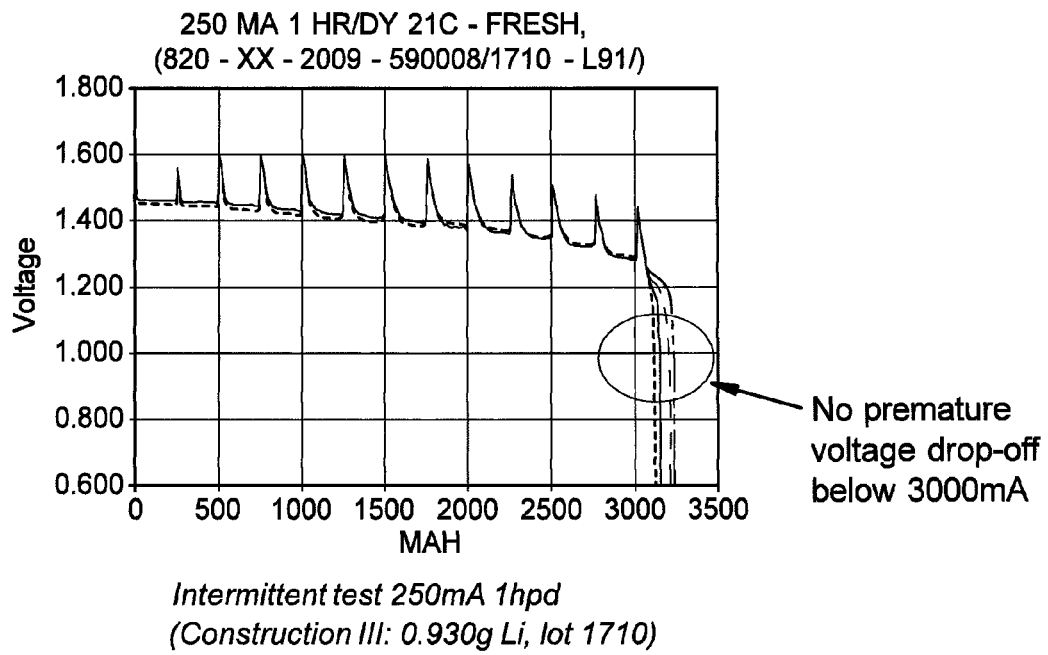
Figure 8B:
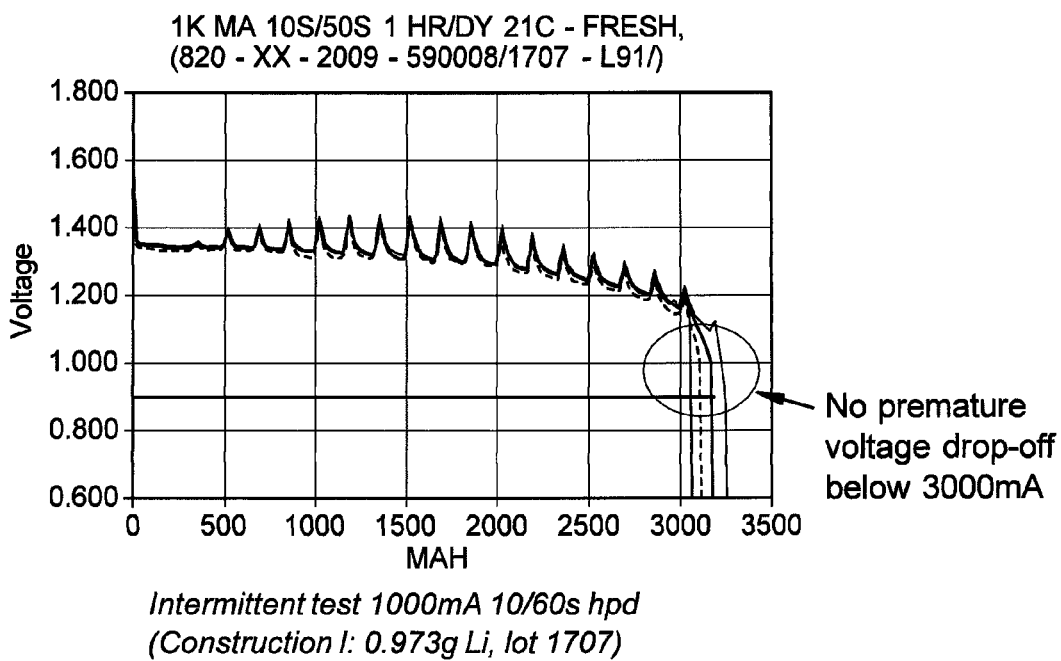
Figure 9:
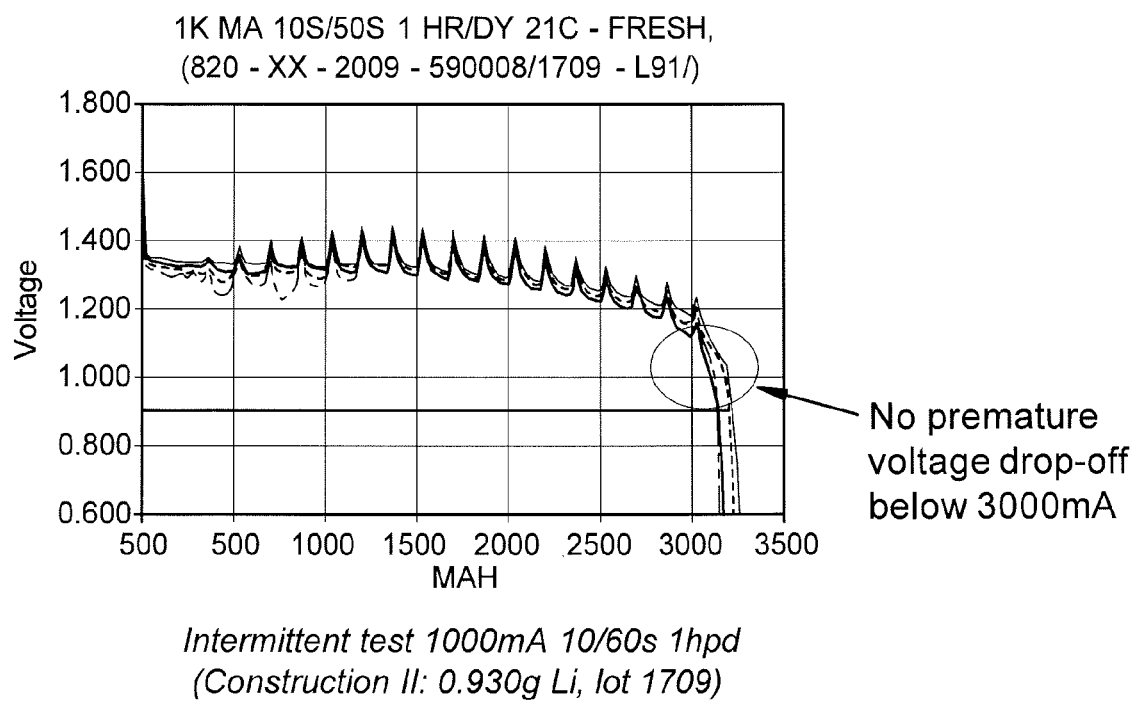

A series of FR6 cells were constructed. The first lot consisted of a "control" group, wherein an anode outer wrap was used. These control cells had between 2% to 6% more interfacially aligned lithium input capacity as compared to the remaining cells. The remaining cells utilized a cathode outer wrap design and hereafter referred to as the "experimental cells". The results of various intermittent discharge tests for the experimental cells are shown in FIGS. 7-9. The information regarding the design and inputs of the cells in these Figures is incorporated by reference herein. Additional information regarding all of the cells described and tested in these Figures, as well as the Figures referenced above, is described in the table of FIG. 10.

What is claimed:
1. An electrochemical cell comprising:
a cylindrical container having positive and negative terminals;
an organic, non-aqueous electrolyte;
an electrode assembly having an anode consisting essentially of lithium or a lithium alloy strip having a thickness, a cathode comprising iron disulfide at least partially coated onto both sides of a solid, metallic foil current collector and a separator disposed between the anode and the cathode;
a first lead establishing electrical connection between the cathode to the positive terminal and a second lead establishing electrical connection between the anode to the negative terminal;
wherein the anode and the cathode are spirally wound so that at least 50% of an outermost surface of the electrode assembly, excluding the separator and optional non-active components, is covered by the cathode; and
wherein the cathode at the outermost surface includes a terminal edge oriented in a substantially axial direction relative to the cylindrical container and the electrode assembly further comprises one selected from the group consisting of: a) a lithium or lithium-alloy patch, oriented in the axial direction and attached to an outermost wind of the anode directly underneath the terminal edge of the cathode, and wherein the second lead is attached to the outermost wind of the anode on the outermost surface of the electrode assembly; and b) a lithium or a lithium alloy combined patch-lead, oriented in the axial direction and attached to the anode, and wherein the combined patch-lead acts as the second lead for the cell.

2. The electrochemical cell of claim 1, wherein the patch or the combined patch-lead has a thickness that is at least one half of the thickness of the anode.

3. The electrochemical cell of claim 1, wherein the patch or the combined patch-lead further comprises a support member positioned so as to sustain direct physical contact between the lithium or lithium alloy of the anode and the lithium or lithium alloy of the patch or the combined patch-lead.

4. The electrochemical cell of claim 3, wherein the support member is made from at least one polymeric material selected from the group consisting of: a polyolefin, polyethylene, polypropylene, polyimide and polyester.

5. The electrochemical cell of claim 1, wherein the combined patch-lead is present and attached to an inner wind of the anode within the electrode assembly.

6. The electrochemical cell of claim 1, wherein the patch is present and attached to an outer-facing side of the anode.

7. The electrochemical cell of claim 1, wherein the patch is present and formed as a plurality of individual pieces of lithium spaced apart along the axial direction.

8. An electrochemical cell comprising:
  a cylindrical container having positive and negative terminals;
  an organic, non-aqueous electrolyte;
  an electrode assembly having an anode consisting essentially of lithium or a lithium alloy strip, a cathode comprising iron disulfide at least partially coated onto both sides of a solid, metallic foil current collector and a separator disposed between the anode and the cathode;
  wherein the anode and the cathode are spirally wound so that at least 50% of an outermost surface of the electrode assembly, excluding the separator and optional non-active components, is covered by the cathode;
  wherein the cathode at the outermost surface includes a terminal edge oriented in a substantially axial direction relative to the cylindrical container; and
  wherein the anode has a substantially uniform thickness except for a localized area of increased thickness directly underneath the terminal edge of the cathode.

9. The electrochemical cell of claim 8, wherein the localized area of increased thickness is at least 150% of a thickness of the remaining anode.

10. The electrochemical cell of claim 8, wherein the localized area of increased thickness comprises a lithium patch affixed to an inner-facing or an outer-facing surface of the anode at a point directly underneath the terminal edge of the cathode.

11. The electrochemical cell of claim 10, wherein the lithium patch further comprises a support member positioned so as to still permit direct physical contact between the lithium or lithium alloy of the anode and the lithium or lithium alloy of the lithium patch.

12. The electrochemical cell of claim 10, wherein the support member is made from at least one polymeric material selected from the group consisting of: a polyolefin, polyethylene, polypropylene, polyimide and polyester.

13. The electrochemical cell of claim 10, wherein the patch is formed as a plurality of individual pieces of lithium spaced apart along the axial direction.

14. A method for improving the discharge capacity of a lithium-iron disulfide cylindrical electrochemical cell, the method comprising:
  providing a lithium-iron disulfide electrochemical cell with a spiral wound electrode assembly having an outermost surface, excluding the separator and optional non-active components, that is at least 50% covered by a cathode strip;
  creating a localized area of increased thickness in the anode strip and positioning said localized area of increased thickness proximate to an outermost terminal edge of the cathode strip within the electrode assembly; and
  causing the cell to be discharged.

15. The method according to 14, wherein the creating a localized area of increased thickness comprises providing a lithium or lithium alloy patch to an anode strip within the electrode assembly proximate to an outermost terminal edge of the cathode strip.

* * * * *